April 19, 1960  M. L. ENDERS  2,932,982
STEERING AID
Filed April 2, 1956

MAX L. ENDERS
INVENTOR.

BY
ATTORNEYS

United States Patent Office 2,932,982
Patented Apr. 19, 1960

2,932,982
STEERING AID
Max L. Enders, South San Gabriel, Calif.

Application April 2, 1956, Serial No. 575,411

1 Claim. (Cl. 74—557)

The present invention relates to the construction of a novel knob for mounting on a steering wheel of an automobile and the novel means used in securing such knob in a stationary, nonrotatable position on the steering wheel.

Steering aids for mounting on a steering wheel have heretofore been proposed, and these involve generally, in many instances, a knob which is shaped generally like a door knob, with such knob being rotatably secured on a portion of the rim of the steering wheel. Besides being relatively expensive in that they involve relatively movable parts, they, under certain conditions, are hazardous in that they present an obstacle to free movement of the driver's hands and arms, particularly when the driver is wearing apparel that has sleeves. Oftentimes the knob, due to its particular door knob shape, is engaged by the driver's sleeve with the result that the automobile is steered in an undesirable direction or prevented from being steered in a desired direction.

In accordance with the present invention a knob is provided, but such knob is so shaped that it is practically impossible for the driver's sleeve to be caught by the same. In this instance, the person's long sleeve slides over the knob without being caught, and undesired steering is not produced and desired steering is not impeded. The same is also true of the driver's fingers since they are less likely to be caught because the knob does not have any reentrant portions which prevent the driver's hand from sliding over the knob.

It is, therefore, an object of the present invention to provide an improved steering aid having the above-indicated desirable features.

Another object of the present invention is to provide an improved steering aid which is relatively simple, inexpensive to manufacture and easy to install and remove from a steering wheel without marring the finish of the outer surface of the steering wheel.

Another object of the present invention is to provide a steering aid incorporating novel means for mounting the aid on a steering wheel.

Another specific object of the present invention is to provide a steering aid having the features mentioned above which is stationarily mounted on the steering wheel.

Another object of the present invention is to provide a steering aid particularly useful in automobiles having power steering.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings, in which:

Figure 1 shows a steering aid 10 embodying features of the present invention mounted on a conventional steering wheel 11 having an open rim 11A of generally circular cross section, as illustrated in Figure 2.

The steering aid includes a knob 22 of plastic material having a base 13 which includes a pair of oppositely extending concave seats 14 and 14A conforming generally with the circular cross section of the rim 11A. Preferably, a thin sheet of elastic material 16 is sandwiched between the seats and the rim 11A to prevent marring of the finish of the rim 11A, as well as to prevent the knob from slipping.

The knob 22 is generally cylindrical, but, in accordance with features of the present invention, is tapered in a direction extending outwardly from the base 13 so that it does not present an undesirable obstacle to the driver's fingers or long sleeves that he may be wearing. The knob 22 is clamped on the rim 11A using the novel structure which is now described in detail.

Figure 2:
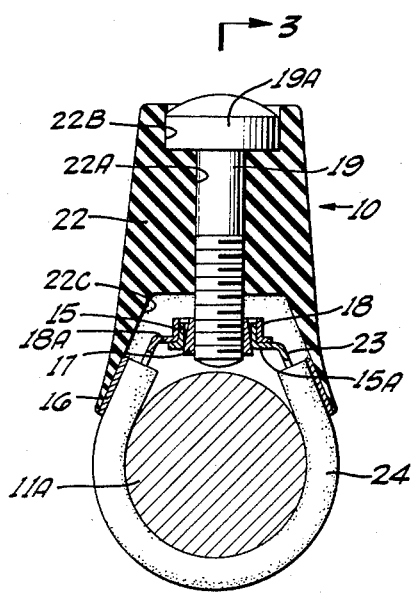
Figure 2 is a sectional view taken substantially on the line 2—2 of Figure 1.
Figure 4:
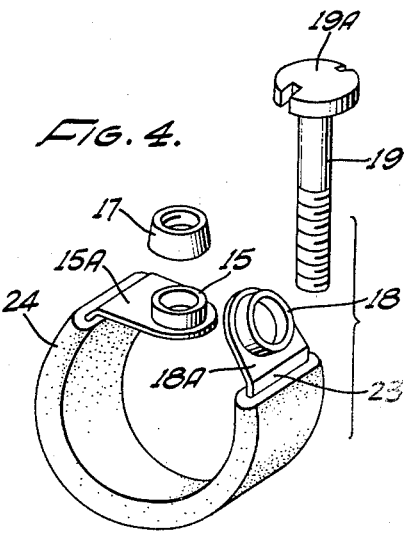
Figure 4 is a perspective view showing certain parts of the steering aid illustrated in the previous figures.

The fastening structure includes generally an open-ended generally circular band 23 of flexible strip metal arranged to encircle a portion of the rim 11A. Soft elastic material 24 covers an intermediate portion of the band and is arranged to be disposed between the band 23 and the rim 11A to prevent marring of the finish of the rim 11A and to prevent the knob from slipping. There is a first apertured portion 15A of relatively small diameter on one end of the band 23, and a first outwardly extending flange 15 of relatively small diameter encircles such apertured portion 15A. A second apertured portion 18A is on the other end of the band and is encircled by a second outwardly extending flange 18 of relatively large diameter so that the flange 15 may be fitted into the larger flange 18, as illustrated in Figure 2. A circular tapered nut 17 is disposed in the aligned apertured portions 15A and 18A in binding engagement with the inner wall of the inner flange 15.

The knob 22 is provided with a centrally apertured portion 22A through which extends a releasable fastening bolt 19 threaded in the tapered nut 17. The upper end of the knob 22 is recessed at 22B to receive and accommodate the head 19A of the fastening bolt 19. The base portion 13 of the knob is also recessed at 22C to receive and accommodate the aligned flanges 15, 18 and the tapered nut 17 and to allow some movement in such recessed portion 22C.

The fastening bolt 19 is sufficiently short so that its inner end does not contact the rim 11A when such bolt is tightened so as to again assure non-marring of the finish of the rim 11A.

Figure 1:
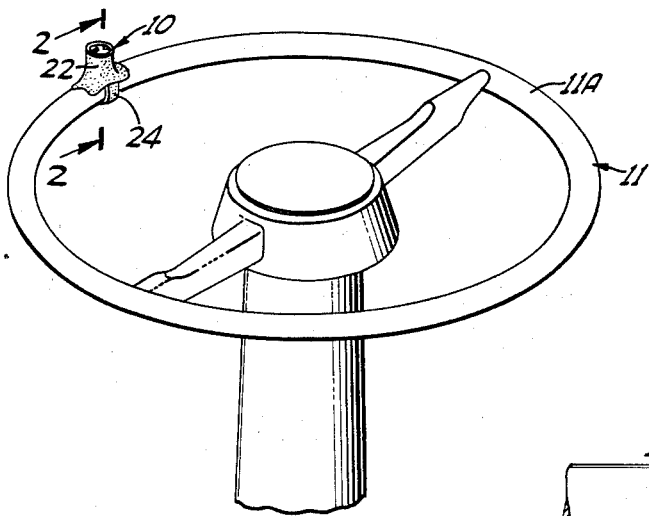
Figure 1 is a perspective view showing a steering aid embodying the present invention mounted on a conventional steering wheel of an automobile.
Figure 3:
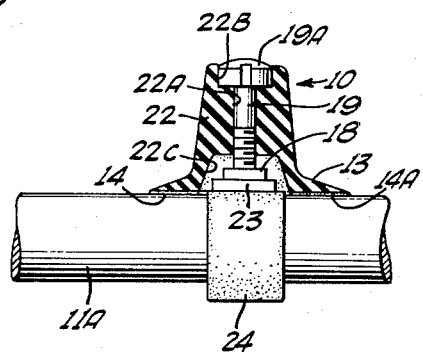
Figure 3 is a sectional view taken substantially on the line 3—3 of Figure 2.

Thus, in installing the steering aid 10 the elements are hand assembled on the rim 11A, as is obvious from a study of Figures 2 and 3, the fastening bolt 19 being screwed into the tapered nut 17 to draw the flexible band 23 snuggly and in binding engagement with a portion of the periphery of the rim 11A so as to securely clamp the knob 22 on the steering wheel without permitting, of course, any rotation of the same.

It is noted that the base of the nut 17 is so shaped and recessed that the flanges 15 and 18 and the inner end of the fastening bolt 19 are not visible so as to impart a pleasing appearance to the assembly.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

A steering aid for mounting on and outwardly of the plane of a steering wheel having an open rim of generally circular cross section comprising an open-ended generally circular band of flexible strip metal arranged to encircle a portion of said rim, soft elastic material covering an intermediate portion of the band and arranged to be disposed between the band and said rim, a first apertured portion of relatively small diameter on one end of said band, a first outwardly extending flange of relatively small diameter encircling said first apertured portion, a second apertured portion of relatively large diameter in comparison to said first apertured portion on the other end of said band, a second outwardly extending flange of relatively large diameter in comparison to said first flange encircling said second apertured portion and arranged to have fitted therein said first flange with said first and second apertured portions aligned, a circular tapered nut in said aligned apertured portions in binding engagement with said first flange, a knob having a base portion which includes a pair of oppositely extending concave seats arranged to conform generally with said generally circular rim, said base having a centrally disposed recessed portion within which is disposed said first and second flanges and said tapered nut, said knob being generally cylindrical but tapered in a direction extending away from the base such that the outer portion of the cylindrical knob which extends outwardly of the plane of the steering wheel is of smaller diameter than said base, said knob having a centrally disposed apertured portion, a bolt extending through said centrally disposed apertured portion and threaded in said tapered nut, and the upper end of said knob being recessed to receive the head of said bolt, and elastic material between said seats and said concave rim.

References Cited in the file of this patent

UNITED STATES PATENTS

| | | |
|---|---|---|
| D. 149,829 | Mungen | June 1, 1948 |
| 1,825,425 | Scannell | Sept. 29, 1931 |
| 2,101,519 | Thorp | Dec. 7, 1937 |
| 2,118,540 | Arsdel | May 24, 1938 |
| 2,449,575 | Wilhelm | Sept. 21, 1948 |
| 2,555,769 | Stites | June 5, 1951 |
| 2,578,860 | Tetzluff | Dec. 18, 1951 |
| 2,710,138 | Burrows | June 7, 1955 |
| 2,790,330 | Sinko | Apr. 30, 1957 |
| 2,809,066 | Curtis | Oct. 8, 1957 |